United States Patent [19]

Nakamura et al.

[11] Patent Number: 5,738,927
[45] Date of Patent: Apr. 14, 1998

[54] PERPENDICULAR MAGNETIC RECORDING MEDIA AND MAGNETIC RECORDING DEVICE

[75] Inventors: Atsushi Nakamura, Hachiouji; Masaaki Futamoto, Tsukui-gun; Yoshiyuki Hirayama, Kodaira; Mikio Suzuki, Odawara; Yukio Honda, Fuchu; Takanobu Takayama, Hannou, all of Japan

[73] Assignee: Hitachi, Ltd., Tokyo, Japan

[21] Appl. No.: 459,794

[22] Filed: Jun. 2, 1995

[30] Foreign Application Priority Data

Jun. 8, 1994 [JP] Japan ..................................... 6-126081

[51] Int. Cl.$^6$ ....................................... G11B 5/66
[52] U.S. Cl. ................ 428/141; 428/65.3; 428/469; 428/694 TS; 428/694 TP; 428/694 SG; 428/694 ST; 428/900; 360/135
[58] Field of Search ..................... 428/65.3, 141, 428/469, 694 TS, 694 TP, 694 SG, 694 ST, 900; 360/135

[56] References Cited

U.S. PATENT DOCUMENTS

| 3,996,095 | 12/1976 | Ahn et al. | 156/610 |
| 4,833,020 | 5/1989 | Shiroishi et al. | 428/336 |
| 5,501,913 | 3/1996 | Shimokawa et al. | 428/694 ML |

*Primary Examiner*—Stevan A. Resan
*Attorney, Agent, or Firm*—Antonelli, Terry, Stout, & Kraus, LLP

[57] ABSTRACT

A film 12 with perpendicular magnetic anisotropy and a protective film 13 are formed over a single-crystal substrate 11. This substrate is made of either a single crystal having a hexagonal crystal structure and a plane (0001) in parallel with the substrate plane or a single crystal having a cubic crystal structure and a plane (111) in parallel with the substrate plane, and the film is epitaxially grown such that its easy axis of magnetization is perpendicular to the substrate plane. As a result, the film can have its perpendicular orientation and perpendicular magnetic anisotropy improved to effect a perpendicular magnetic recording of high density thereby to provide the perpendicular magnetic recording media, of which the film has a remarkably enhanced orientation.

28 Claims, 3 Drawing Sheets

PERPENDICULAR MAGNETIC RECORDING MEDIA AND MAGNETIC RECORDING DEVICE

BACKGROUND OF THE INVENTION

The present invention relates to both perpendicular magnetic recording media having a magnetic film suitable for high-density magnetic recording and a magnetic recording device using the media.

On the background of a development in the computerized society, there is more and more enhanced a demand for a magnetic recording device capable of storing massive information and inputting/outputting it at a high speed and accordingly for an improvement in a recording density so as to compactly record more information. In accordance with this, the perpendicular magnetic recording system has been noted as a new one in place of the longitudinal magnetic recording system used in the prior art. The perpendicular magnetic recording is a recording system in which the magnetization established in the direction perpendicular to the surface of the recording media is used as the recorded bit and can reduce the demagnetization field at its magnetization transition so that it can be suited for the high-density recording. This concept is described in the papers of S. Iwasaki, as disclosed on pp. 1272 of IEEE Transactions on Magnetics, MAG-13 (1977). The recording media to be used in this perpendicular magnetic recording are required to have an easy axis of magnetization in the direction perpendicular to their surfaces and a high magnetic anisotropy. For these requirements, there have been investigated and developed the thin film media which have the film with perpendicular magnetic anisotropy on the substrate.

It has been investigated in the prior art that the recording films of the perpendicular magnetic recording media are made of a Co alloy having a high magnetic anisotropy. The Co alloy such as a CoCr alloy has a hexagonal close-packed structure and exhibits a uniaxial magnetic anisotropy along a c-axis, which is the easy axis of magnetization. If a thin film of the Co alloy is formed over the surface of an amorphous substrate of glass or the like, the close-packed plane of atoms or the plane (0001) is liable to be in parallel with the substrate plane, and a polycrystalline thin film having a [0001] direction perpendicular to the substrate plane is obtained. This film exhibits the perpendicular magnetic anisotropy but has to be given a higher magnetic anisotropy so that it may be used as the perpendicular magnetic recording media.

Incidentally, the aforementioned Co alloy film is formed through a process of free nucleation and growth on the surface of the amorphous substrate so that the direction of the c-axis or the easy axis of magnetization is different for the individual crystal grains to have a considerably large dispersion in the film entirety. As a result, the magnetic anisotropy has an insufficient magnitude. Therefore, a trial has been made to form an underlayer over the substrate thereby to improve the c-axis orientation of the Co alloy magnetic film. As a result, it has been reported that the orientation of the Co alloy magnetic film can be improved by exemplifying the underlayer by a thin film of Ti or the like having a hexagonal close-packed structure or an amorphous thin film of Ge or the like. The Ti underlayer is described in the papers of H. S. Gill, as disclosed on pp. 1644 of IEEE Transactions on Magnetics, MAG-19 (1983). The Ge underlayer is described in the papers of M. Futamoto, as disclosed on 1426 of IEEE Transactions on Magnetics, MAG-21 (1985).

However, the magnitude of the dispersion of the c-axis of the Co alloy magnetic film formed by such method cannot be said to be sufficiently small. In the case of actual recording/reproduction of high density, a high recording/reproducing outputs could not be produced to fail to improve the recording density.

On the other hand, a method of an epitaxial growth on the single-crystal substrate is generally known as the method for controlling the crystal orientation of the thin film. The method of using the single-crystal substrate for producing the perpendicular magnetic recording media is disclosed in Japanese Patent Laid-Open Nos. 44222/1982 and 61819/1990. Moreover, a method of forming the film which is caused to manifest the perpendicular magnetic anisotropy according to the shape by using a single-crystal substrate having fine corrugations on the surface is disclosed in Japanese Patent Laid-Open No. 288004/1988. According to these methods, however, the film was not epitaxially grown on the substrate while holding a clear orientation relationship so that the crystal orientation was not sufficient. Especially the former (Japanese Patent Laid-Open No. 44222/1982) needs a step of peeling the film from the substrate and may break the film. The method of preparing the media by epitaxially growing the magneto-optical recording medium material with a single-crystal substrate is disclosed in Japanese Patent Laid-Open Nos. 1154/1987, 140444/1989 and 36528/1993. However, none of these can succeed in providing media suitable for the perpendicular magnetic recording media.

SUMMARY OF THE INVENTION

An object of the present invention is to provide perpendicular magnetic recording media which have a more excellent crystal orientation and a higher perpendicular magnetic anisotropy that those of the aforementioned Co alloy film formed over an amorphous substrate and to provide a magnetic recording device.

The perpendicular magnetic recording media having a first construction of the present invention is characterized in: (1) perpendicular magnetic recording media comprising: a substrate made of a single crystal; a film with perpendicular magnetic anisotropy formed over the substrate and made of Co or an alloy having a main component of Co; and a protective film formed over the film with perpendicular magnetic anisotropy, wherein the film with perpendicular magnetic anisotropy is epitaxially grown over the substrate to have an easy axis of magnetization perpendicular to the plane of the substrate; (2) that the plane of the substrate is as even as to have a surface roughness Ra of no more than 10 nm; (3) that a specific first crystal axis shared among the individual crystal grains of the film with perpendicular magnetic anisotropy is arranged perpendicularly to the substrate plane, and that a second crystal axis made perpendicular to but different from the first crystal axis and shared among the individual crystal grains is arranged in one direction of the substrate plane; and (4) that a distance between the nearest atoms in the substrate plane (as called the "a(S)") and a distance between the nearest atoms in a plane of the film with perpendicular magnetic anisotropy in parallel with the substrate (as called the "a(F)") satisfy the following relations:

$$|a(F)-a(S)|/a(S) \geqq 0.005.$$

The perpendicular magnetic recording media having a second construction of the present invention is characterized in: (1) perpendicular magnetic recording media comprising: a substrate made of a single crystal; an underlayer formed over the substrate; a film with perpendicular magnetic anisotropy formed over the underlayer and made of Co or an alloy having a main component of Co; and a protective film formed over the film with perpendicular magnetic anisotropy, wherein the underlayer and the film with perpendicular magnetic anisotropy are epitaxially grown over the substrate and the underlayer, respectively, such that the film with perpendicular magnetic anisotropy has an easy axis of magnetization perpendicular to the plane of the substrate; (2) that the plane of the substrate is as even as to have a surface roughness Ra of no more than 10 nm; (3) that a specific first crystal axis shared among the individual crystal grains of the underlayer is arranged perpendicularly to the substrate plane, that a second crystal axis made perpendicular to but different from the first crystal axis and shared among the individual crystal grains of the underlayer is arranged in one direction of the substrate plane, that a specific third crystal axis shared among the individual crystal grains of the film with perpendicular magnetic anisotropy is arranged perpendicularly to the substrate plane, and that a fourth crystal axis made perpendicular to but different from the third crystal axis and shared among the individual crystal grains of the film with perpendicular magnetic anisotropy is arranged in one direction of the substrate plane; and (4) that a distance between the nearest atoms in the substrate plane (as called the "a(S)"), a distance between the nearest atoms in a plane of the underlayer in parallel with the substrate (as called the "a(U)"), and a distance between the nearest atoms in a plane of the film with perpendicular magnetic anisotropy in parallel with the substrate (as called the "a(F)") satisfy the following relations:

$$|a(U)-a(S)|/a(S) \geq 0.005,$$

preferably $$|a(F)-a(U)|/a(U) \leq 0.25;$$

and most preferably $$|a(F)-a(U)|/a(U) \leq 0.15.$$

In the perpendicular magnetic recording media having the first and second constructions of the present invention, the substrate: is (1) made of a material selected from the group consisting of chemical compounds of $Al_2O_3$, $Cr_2O_3$, BeO, ZnO and a material composed mainly of any of the chemical compounds having a hexagonal crystal structure and has a plane (0001) in parallel with the substrate plane; (2) made of a material selected from the group consisting of chemical compounds and elements of MgO, LiF, $SrTiO_3$, $CaF_2$, $BaF_2$, SiC, Si, Ge and a material composed mainly of any of the chemical compounds or elements having a cubic crystal structure and has a plane (111) in parallel with the substrate plane; (3) made of a soft magnetic material and has a hexagonal crystal structure and a plane (0001) in parallel with the substrate plane; (4) made of a soft magnetic material and has a cubic crystal structure and a plane (111) in parallel with the substrate plane; (5) made of a ferrite, as expressed by a chemical formula of $MO \cdot nFe_2O_3$ if n designates a positive integer not zero and if M designates a metallic element, and wherein the metal M is at least one of the materials selected from the group consisting of elements Mn, Fe, Ni, Zn and Mg, and mixtures containing at least two of the elements; or (6) made of a ferrite, as expressed by a chemical formula of $BaO \cdot 6Fe_2O_3$. Incidentally, the substrate has its plane formed with fine corrugations.

In the perpendicular magnetic recording media having the first and second constructions of the present invention, moreover, the underlayer has a hexagonal close-packed structure and an orientation of [0001] perpendicular to the substrate plane.

In the perpendicular magnetic recording media having the second construction of the present invention, the underlayer is: (1) made of at least one material having a hexagonal close-packed structure and selected from a group consisting of elements Co, Hf, Mg, Os, Re, Ru, Ti, Zn and Zr and alloys composed mainly of any of the elements, and an orientation of [0001] perpendicular to the substrate plane; and (2) made of at least one material having a face-centered cubic structure and selected from a group consisting of elements Ag, Al, Au, Co, Cu, Ir, Ni, Pd, Pt and Rh and alloys composed mainly of any of the elements, and has an orientation of <111> perpendicular to the substrate plane.

The magnetic recording device of the present invention is constructed to include: perpendicular magnetic recording media according to the aforementioned first and second constructions; a holder for holding the perpendicular magnetic recording media; a magnetic recording head for recording/reproducing information in/from the perpendicular magnetic recording media; moving means for moving the relative positions of the magnetic head and the perpendicular magnetic recording media; and control means for controlling those components. The magnetic head is constructed of: (1) a thin film ring head for recording/reproducing information; (2) a thin film ring head for recording information and a magnetoresistive head for reproducing the information; (3) a single pole head for recording/reproducing information; or (4) a single pole head for recording information and a magnetoresistive head for reproducing the information.

The magnetic recording device is characterized: in that the perpendicular magnetic recording media and the information recording/reproducing magnetic head record and reproduce the information while contacting with each other; or in that the perpendicular magnetic recording media and the information recording/reproducing magnetic head are arranged close to each other to record and reproduce the information.

Thanks to the constructions described above, the thin film formed over the surface of the single-crystal substrate has a specific orientation relation in its entirety to the substrate. The thin film growth of this is called the "epitaxial growth". The film obtained by the epitaxial growth inherits the crystal orientation from the substrate to exhibit a remarkably intense orientation. The present invention makes use of this epitaxial growth so that it can provide a film with perpendicular magnetic anisotropy having a more intense orientation than that of the prior art. For this, the substrate is made of either a single crystal having a hexagonal crystal structure and a plane (0001) in parallel with the substrate plane or a single crystal having a cubic crystal structure and a plane (111) in parallel with the substrate plane. These two substrate planes have basically identical atomic arrangements although their distances between atoms are different depending upon the materials. FIG. 3 schematically illustrates the atomic arrangement of the substrate plane. In case a film made of a material having the hexagonal or cubic crystal structure is formed over the substrate, it is liable to epitaxially grow to arrange its plane (0001) for the hexagonal crystal structure or its plane (111) for the cubic crystal structure in parallel with the substrate plane. The Co alloy to be used as the recording film of the perpendicular magnetic recording media has the hexagonal close-packed structure so that it will epitaxially grow, if formed over the substrate, to have the plane (0001) in parallel with the substrate plane thereby to exhibit the [0001] orientation perpendicular to the substrate plane. The orientation relationship between the substrate and the film with perpendicular magnetic anisotropy is: in case the substrate having the hexagonal crystal structure is used, (0001) Film//(0001) Substrate, and <11'2'0> Film//<11'2'0> Substrate;

and in case the substrate having the cubic crystal structure is used, (0001) Film//(111) Substrate, and <11'2'0> Film//<11'0> Substrate.

(Here, indexes 2' and 1' indicate the indexes −2 and −1, respectively.)

The films with perpendicular magnetic anisotropy thus obtained exhibits more intense c-axis orientations than those of the prior art.

However, the epitaxially grown films with perpendicular magnetic anisotropy have an identical crystal orientation all thereover and may have their crystal grains enlarged into single-crystal films. As a result, the coercivity drops to deteriorate the magnetization stability. In order to solve this problem, the present invention has noted the difference in the lattice constant between the film with perpendicular magnetic anisotropy and the substrate. Specifically, it is important that a distance between the nearest atoms in the substrate plane (as called the "a(S)") and a distance between the nearest atoms in a plane of the film with perpendicular magnetic anisotropy in parallel with the substrate (as called the "a(F)") satisfy the following relations:

$$|a(F)-a(S)|/a(S) \geq 0.005.$$

If the difference in the lattice constant between the film and the substrate is not less than 0.5%, the epitaxially grown film is not made of the single crystal but formed with sub-grains which are divided by the crystal defects introduced for reducing the incoincidence of lattice. By thus forming the fine subgrains, it is possible to form the highly oriented film with perpendicular magnetic anisotropy without degrading the coercivity.

In order to adjust the difference in the lattice constant between the substrate and the film, a suitable underlayer may be sandwiched between the substrate and the film. In this case, the material for the underlay is selected from one having a hexagonal or cubic crystal structure so that the substrate, the underlayer and the film may satisfy a series of epitaxial orientation relationship. In this case, by considering the difference in the lattice constant between the substrate and the underlayer, the underlayer may be selected such that a distance between the nearest atoms in the substrate plane (as called the "a(S)"), and a distance between the nearest atoms in a plane of the underlayer in parallel with the substrate (as called the "a(U)") satisfy the following relations:

$$|a(U)-a(S)|/a(S)|/a(S) \geq 0.005.$$

In case the underlayer is made of the material which has a lattice constant closer to that of the film than that of the substrate, the crystal defects or the like are introduced into the underlayer, when it is formed, to form the sub-grains. This raises an effect that the film formed over the underlayer has less lattice defects and a better crystallization. In case, on the other hand, the underlayer is made of the material which has a lattice constant closer to that of the substrate than that of the film, it is formed of a single crystal but causes an effect that the subgrains are finely formed in the film. The perpendicular magnetic recording media thus prepared can have intense crystal orientation and perpendicular magnetic anisotropy to effect a perpendicular magnetic recording of higher density than that of the prior art.

Moreover, the substrate is formed in its surface with fine corrugations of various shapes having a surface roughness Ra of no more than 10 nm, such as concentric grooves formed circumferentially of the substrate and having a depth of no more than 10 nm, irregularly arranged dents having a depth of no more than 10 nm, so that the contact area when the media surface and the head surface come into contact can be reduced to prevent their stick. Since, moreover, the diffusion distance of atoms on the substrate surface is suppressed at the time of forming the film, the density of forming the crystal nuclei is increased to cause an effect that the crystal grains or sub-grains are fine. In case the corrugations are high, the head and the media are liable to collide when the spacing inbetween is reduced, and a protective film cannot be evenly formed over the surface of the magnetic film so that the magnetic film is oxidized to have its characteristics deteriorated.

DETAILED DESCRIPTION OF THE PREFERRED EMBODIMENTS

Figure 1:
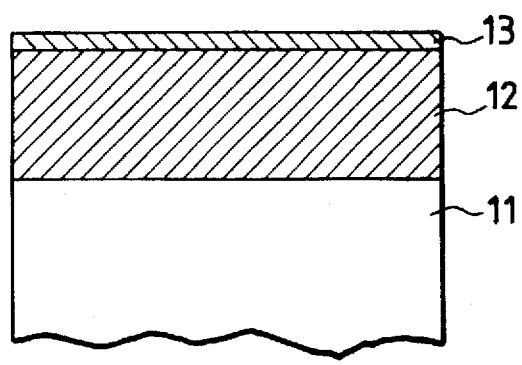
FIG. 1 is a schematic diagram showing a sectional structure of perpendicular magnetic recording media according to a first mode of embodiment of the present invention.

A first mode of embodiment of the perpendicular magnetic recording media of the present invention is the perpendicular magnetic recording media, which is constructed, as shown in FIG. 1, to include a substrate 11, a film 12 with perpendicular magnetic anisotropy formed over the substrate, and a protective film 13 formed over the film with perpendicular magnetic anisotropy. It is preferable that the substrate is made of a single crystal and that the film 12 is epitaxially grown over the substrate 11. Specifically, a specific crystal axis shared among the individual crystal grains of the film 12 is arranged perpendicular to the substrate, and another crystal axis perpendicular to the former and shared among the individual crystal grains is arranged in one direction in the substrate plane.

Figure 2:
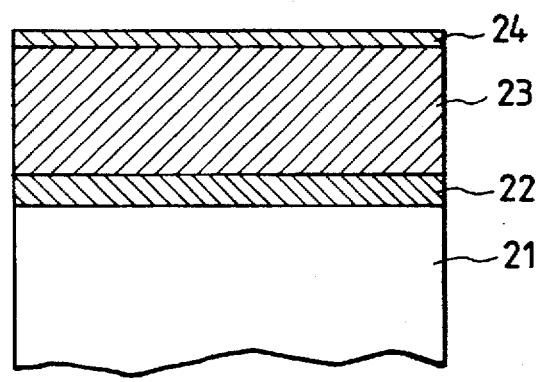
FIG. 2 is a schematic diagram showing a sectional structure of perpendicular magnetic recording media according to a second mode of embodiment of the present invention.
Figure 3:
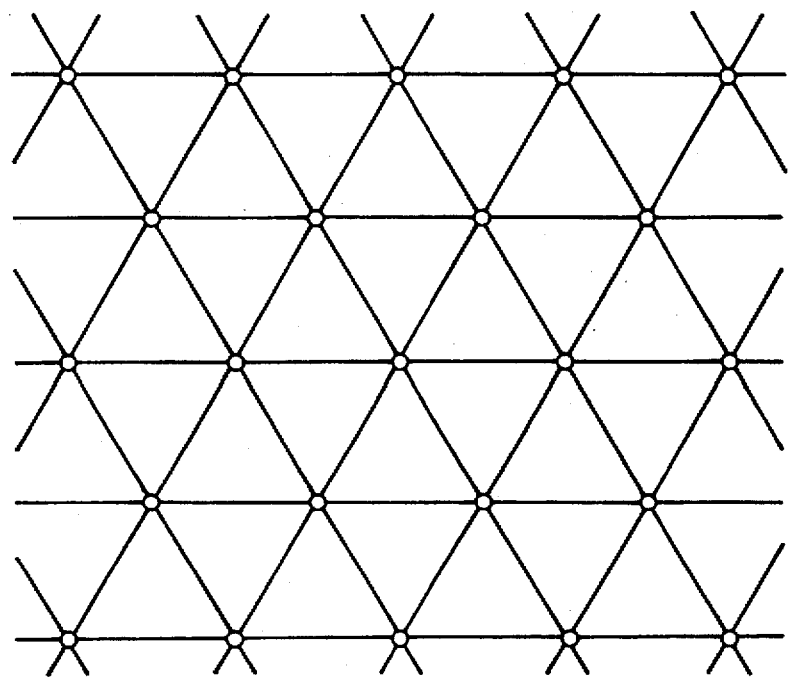
FIG. 3 is a schematic diagram showing an atomic arrangement, as taken on a substrate plane, of a single-crystal substrate to be used in the present invention.

A second mode of embodiment of the perpendicular magnetic recording media of the present invention is the perpendicular magnetic recording media, which is constructed, as shown in FIG. 2, to include a substrate 21, an underlayer 22 formed over the substrate, a film 23 with perpendicular magnetic anisotropy formed over the underlayer, and a protective film 24 formed over the film with perpendicular magnetic anisotropy. It is preferable that the substrate is made of a single crystal and that the film 23 and the underlayer 22 are epitaxially grown over underlayer 22 and the substrate 21, respectively. Specifically: a specific crystal axis shared among the individual crystal grains of the underlayer 22 is arranged in the normal to the film plane; another crystal axis perpendicular to the former crystal axis and shared among the individual crystal grains is arranged in one direction in the substrate plane; a specific crystal axis shared among the individual crystal grains with the film 23 is arranged in the normal to the film plane; and another crystal axis perpendicular to the former crystal axis and shared among the individual crystal grains is arranged in one direction in the substrate plane.

In the first and second modes of embodiment: (1) it is the most preferable that the films 12 and 23 with perpendicular magnetic anisotropy are made of Co or alloys composed mainly of Co; (2) it is the most preferable that the substrate is as even as to have a surface roughness Ra of no more than 10 nm; and (3) it is preferable that a distance between the nearest atoms in the substrate plane (as called the "a(S)"), a distance between the nearest atoms in a plane of the film with perpendicular magnetic anisotropy in parallel with the substrate (as called the "a(F)"), and a distance between the nearest atoms in a plane of the underlayer in parallel with the substrate (as called the "a(U)") satisfy the following relations:

for the first mode of embodiment, $$|a(F)-a(S)|/a(S) \leqq 0.005;$$

and
for second mode of embodiment, $$|a(U)-a(S)|/a(S) \geqq 0.005.$$

In the first and second modes of embodiment, the substrate: is preferably (1) made of a material selected from the group consisting of chemical compounds of $Al_2O_3$, $Cr_2O_3$, BeO, ZnO and a material composed mainly of any of the chemical compounds having a hexagonal crystal structure and has a plane (0001) in parallel with the substrate plane; (2) made of a material selected from the group consisting of chemical compounds and elements of MgO, LiF, $SrTiO_3$, $CaF_2$, $BaF_2$, SiC, Si, Ge and a material composed mainly of any of the chemical compounds or elements having a cubic crystal structure and has a plane (111) in parallel with the substrate plane; (3) made of a single-crystal ferrite of a soft magnetic material having a spinel crystal structure and a plane (111) in parallel with the substrate plane, as expressed by a chemical formula of $MO \cdot nFe_2O_3$ if n designates a positive integer not zero and if M designates a metallic element, and wherein the metal M is at least one of the materials selected from the group consisting of elements Mn, Fe, Ni, Zn and Mg, and mixtures containing at least two of the elements; or (4) made of a single-crystal ferrite having a hexagonal magnetoplumbite structure and a plane (0001) in parallel with the substrate plane, as expressed by a chemical formula of $BaO \cdot 6Fe_2O_3$. Incidentally, the material for the substrate may contain some impurity within such a range as to leave the crystal structure unchanged. The substrate can be exemplified in addition to the aforementioned ones by a single-crystal substrate of another material having a hexagonal crystal structure and a plane (0001) in parallel with the substrate plane, a single-crystal substrate of another material having a cubic crystal structure and a plane (111) in parallel with the substrate plane, or a single-crystal substrate of another soft magnetic material having a cubic or hexagonal crystal structure.

In the second mode of embodiment, a distance between the nearest atoms in a plane of said underlayer in parallel with said substrate (as called the "a(U)"), and a distance between the nearest atoms in a plane of the film with perpendicular magnetic anisotropy in parallel with the substrate (as called the "a(F)") satisfy the following relations:
preferably $$|a(F)-a(U)|/a(U) \leqq 0.25;$$

and
most preferably $$|a(F)-a(U)|/a(U) \leqq 0.15.$$

The underlayer is: (1) made of at least one material having a hexagonal close-packed structure and selected from a group consisting of elements Co, Hf, Mg, Os, Re, Ru, Ti, Zn and Zr and alloys composed mainly of any of said elements, and an orientation of [0001] perpendicular to the substrate plane; or (2) made of at least one material having a face-centered cubic structure and selected from a group consisting of elements Ag, Al, Au, Co, Cu, Ir, Ni, Pd, Pt and Rh and alloys composed mainly of any of said elements, and has an orientation of <111> perpendicular to the substrate plane. The present invention will be described in detail in connection its representative embodiments with reference to the accompanying drawings.

<Embodiment 1>

Figure 4:
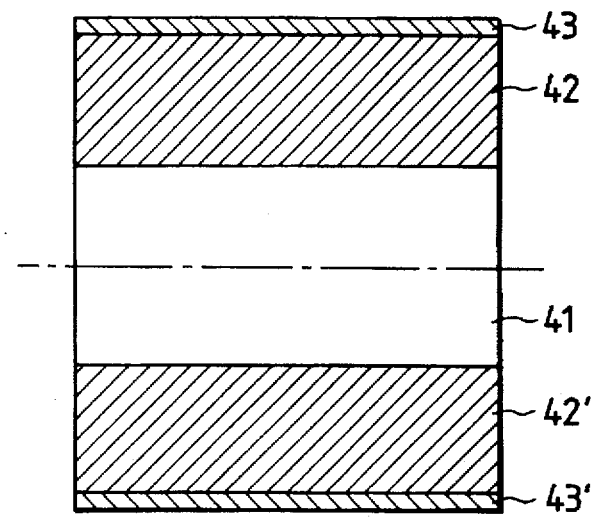
FIG. 4 is a schematic diagram showing a sectional structure of the perpendicular magnetic recording media of embodiments 1 and 3 of the present invention.

A single-crystal substrate (having a plane (0001) in parallel with the substrate plane and a surface roughness of Ra=1 nm) of $Al_2O_3$ (sapphire) having a mirror-polished surface and a diameter of 1 inch was used to prepare magnetic recording media having a sectional structure, as shown in FIG. 4, by the DC magnetron sputtering method. A single-crystal substrate 41 is formed on its two sides with Co alloy magnetic films 42 and 42' and carbon protective films 43 and 43' in the recited order. Incidentally, the single-crystal substrate of $Al_2O_3$ (sapphire) has a hexagonal corundum structure, and the Co alloy magnetic films have a hexagonal close-packed structure. The Co alloy magnetic films and the carbon protective films were formed by using argon gases under conditions of a gas pressure of 0.7 Pa, a substrate temperature of 250° C. and a filming rate of 50 nm/min. The target to be used for forming the magnetic films was composed of Co—15 at. % of Cr—5 at. % of Ta. The Co alloy magnetic films had a thickness of 80 nm, and the carbon protective films had a thickness of 10 nm. The formations of all the aforementioned films were continued in an identical vacuum chamber without interrupting the evacuation. The composition of the Co alloy magnetic films was substantially identical to that of the target, i.e., $CoCr_{15}Ta_5$ and had a distance between the nearest atoms of 0.251 nm.

The samples thus prepared had their crystal orientations and magnetic characteristics measured by the X-ray diffractions and the vibrating sample magnetometer (VSM), respectively. By the X-ray diffractions, only the 0002 diffraction peak of the Co alloy was observed in addition to the diffraction of the substrate to reveal that the films were oriented in the [0001] perpendicular to the substrate plane. By measuring the X-ray pole figure, moreover, an intense crystal orientation in the film planes was also revealed. The measurement of the rocking curve of the 0002 diffraction peak of the Co alloy revealed that the magnetic recording media of the present embodiment was extremely reduced in the full width at half maximum of the rocking curve, as compared with that of the magnetic recording media prepared under the common conditions by using a glass substrate, so that the orientation [0001] of the Co alloy magnetic films were remarkably improved to improve the coercivity to 1,400 (Oe) by 12.0% in the direction perpendicular to the film plane.

On the other hand, similar effects in the improvement to the aforementioned ones could be achieved even if the single-crystal substrate of $Al_2O_3$ was replaced by any of single-crystal substrates of $Cr_2O_3$, BeO, ZnO having a hexagonal crystal structure and a plane (0001) in parallel with the substrate plane. Moreover, similar effects in the improvement to the aforementioned ones could be achieved even if the single-crystal substrates were made of not only MgO having a cubic NaCl type crystal structure but also MgO, LiF, $SrTiO_3$, $CaF_2$, $BaF_2$, SiC, Si, Ge having a cubic crystal structure and a plane (111) in parallel with the substrate plane. The coercivity, as obtained in the direction perpendicular to the film plane, is enumerated in Table 1 together with the distance of the nearest atoms of the substrate and the data of the full width at half maximum of the rocking curve. In view of the magnitude of the coercivity in the perpendicular direction to the film plane, as enumerated in Table 1, preferable results are achieved from the substrate materials of $Al_2O_3$, MgO, $SrTiO_3$ and Si. Incidentally, Table 1 further enumerates the misfit percentage, as expressed by the following relation, if the distance between the nearest atoms in the substrate plane is called the "a(S)" and if the distance between the nearest atoms in the plane of the film with perpendicular magnetic anisotropy is called the "a(F)":

$$100 \times (a(F) - a(S))/a(S).$$

TABLE 1

| SUB | CAD (nm) | FW (Deg.) | CF (Oe) | MF (%) |
|---|---|---|---|---|
| $Al_2O_3$ | 0.4763 | 1.2 | 1400 | 89.8 |
| $Cr_2O_3$ | 0.4954 | 1.8 | 1280 | 97.4 |
| BeO | 0.2698 | 1.9 | 1290 | 7.5 |
| ZnO | 0.3250 | 1.6 | 1260 | 29.5 |
| MgO | 0.2979 | 0.9 | 1390 | 18.7 |
| LiF | 0.2848 | 1.8 | 1300 | 13.5 |
| $SrTiO_3$ | 0.2761 | 1.3 | 1350 | 10.0 |
| $CaF_2$ | 0.3863 | 1.5 | 1290 | 53.9 |
| $BaF_2$ | 0.4384 | 1.9 | 1260 | 74.7 |
| SiC | 0.3083 | 1.9 | 1280 | 22.8 |
| Si | 0.3840 | 1.3 | 1290 | 53.0 |
| Ge | 0.4000 | 1.2 | 1270 | 59.4 |
| Glass (Cp.) | — | 8.7 | 1250 | — |

SUB: Substrate
CAD: Distance between Closest Atoms
FW: Full Width at Half Maximum of X-Ray Rocking Curve
CF: Coercivity in Perpendicular Direction
MF: Misfit Percentage
Cp.: Comparison <Embodiment 2>

Figure 5:
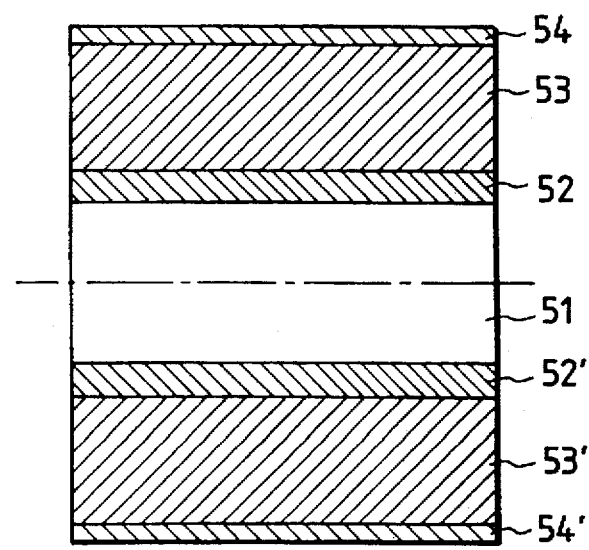
FIG. 5 is a schematic diagram showing a sectional structure of the perpendicular magnetic recording media of embodiments 2 and 4 of the present invention.

A single-crystal substrate (having a plane (111) in parallel with the substrate plane and a surface roughness of Ra=1 nm) of MgO having a mirror-polished surface and a diameter of 0.8 inches was used to prepare magnetic recording media having sectional structure, as shown in FIG. 5, by the DC magnetron sputtering method. A single-crystal substrate 51 is formed on its two sides with Cu underlayers 52 and 52', Co alloy magnetic films 53 and 53' and carbon protective films 54 and 54' in the recited order. Incidentally: the single-crystal substrate of MgO has a cubic NaCl type crystal structure; the Cu underlayers have a face-centered cubic structure; and the Co alloy magnetic films have a hexagonal close-packed structure. The Cu underlayers, the Co alloy magnetic films and the carbon protective films were formed by using argon gases under conditions of a gas pressure of 0.7 Pa, a substrate temperature of 250° C. and a filming rate of 50 nm/min. The target to be used for forming the magnetic films was composed of Co—12 at. % or Cr—10 at. % of Pt. The Cu underlayers had a thickness of 20 nm; the Co alloy magnetic films had a thickness of 100 nm; and the carbon protective films had a thickness of 10 nm. The formations of all the aforementioned films were continued in an identical vacuum chamber without interrupting the evacuation. The composition of the Co alloy magnetic films was substantially identical to that of the target, i.e., $CoCr_{12}Pt_{10}$ and had a distance between the nearest atoms of 0.255 nm.

The samples thus prepared had their crystal orientations and magnetic characteristics measured by the X-ray diffractions and the vibrating sample magnetometer (VSM), respectively. By the X-ray diffractions, the 111 diffraction peak of Cu and the 0002 diffraction peak of the Co alloy were observed in addition to the diffraction of the substrate to reveal that the Cu underlayers were oriented in the <111> perpendicular to the substrate plane, and that the Co alloy films were oriented in the [0001] perpendicular to the substrate plane. By measuring the X-ray pole figure, moreover, an intense crystal orientation in the film planes was also revealed. The measurement of the rocking curve of the 0002 diffraction peak of the Co alloy revealed that the magnetic recording media of the present embodiment was extremely reduced in the full width at half maximum of the rocking curve, as compared with that of the magnetic recording media prepared under the common conditions by using a glass substrate, so that the orientation [0001] of the Co alloy magnetic films were remarkably improved to improve the coercivity to 1,650 (Oe) by 13.8% in the direction perpendicular to the film plane.

On the other hand, similar effects in the improvement to the aforementioned ones could be achieved even if the aforementioned Cu underlayers were replaced by any of underlayers of Ag, Al, Au, Ir, Pd, Pt, Rh and Pt-Rh alloy having a face-centered cubic crystal structure. Moreover, similar effects in the improvement to the aforementioned ones could be achieved even if the underlayers were made of Hf, Mg, Os, Re, Ru, Ti, Zn, Zr, and Ti-Zr alloy having a hexagonal close-packed structure. The results of the coercivity, as obtained in the perpendicular direction, are enumerated in Table 2 together with the data of the full width at half maximum of the rocking curve and the data of the distance of the nearest atoms of the underlayers. In case the substrate is a single-crystal substrate of MgO (having a plane (111) in parallel with the substrate plane), in view of the magnitude of the coercivity in the perpendicular direction to the film plane, as enumerated in Table 2, preferable results are achieved from the underlayer materials of Cu, Ti and Ru. Table 2 further enumerates the misfit percentages 1 and 2, as expressed by the following relations, if the distance between the nearest atoms in the substrate plane is called the "a(S)", if the distance between the nearest atoms in the plane of the film with perpendicular magnetic anisotropy is called the "a(F)", and if the distance between the nearest atoms in a plane of said underlayer in parallel with said substrate is called the "a(U)":

for Misfit 1, $$100 \times |a(U) - a(S)|/a(S);$$

and
for Misfit 2, $$100 \times |a(F) - a(U)|/a(U).$$

By using the perpendicular recording media prepared by the methods of the individual embodiments described above, there were fabricated a magnetic recording device of which the recording/reproducing magnetic head was exemplified by a thin film ring head, and a magnetic recording device of which the recording magnetic head was exemplified by a thin film ring head and the reproducing magnetic head was exemplified by a magnetoresistive head.

TABLE 2

| UL | CAD (nm) | FW (Deg.) | CF (Oe) | MF1 (%) | MF2 (%) |
|---|---|---|---|---|---|
| Cu | 0.2556 | 1.2 | 1650 | 14.2 | 0.2 |
| Ag | 0.2889 | 1.6 | 1510 | 3.0 | 11.7 |
| Al | 0.2864 | 1.6 | 1580 | 3.9 | 11.0 |
| Au | 0.2884 | 1.8 | 1490 | 3.2 | 11.6 |
| Ir | 0.2715 | 1.3 | 1500 | 8.9 | 6.1 |
| Pd | 0.2751 | 1.3 | 1510 | 7.7 | 7.3 |
| Pt | 0.2774 | 1.2 | 1590 | 6.9 | 8.1 |
| Rh | 0.2689 | 1.5 | 1520 | 9.7 | 5.2 |
| Pt-Rh | 0.2727 | 1.4 | 1580 | 8.5 | 6.5 |
| Hf | 0.3197 | 2.1 | 1480 | 7.3 | 20.2 |
| Mg | 0.3209 | 2.3 | 1500 | 7.7 | 20.5 |
| Os | 0.2735 | 1.9 | 1480 | 8.2 | 6.8 |
| Re | 0.2761 | 1.5 | 1460 | 7.3 | 7.6 |
| Ru | 0.2704 | 1.3 | 1610 | 9.2 | 5.7 |
| Ti | 0.2950 | 1.3 | 1640 | 1.0 | 13.6 |
| Zn | 0.2665 | 1.7 | 1580 | 10.5 | 4.3 |
| Zr | 0.3232 | 1.9 | 1520 | 8.5 | 21.1 |

TABLE 2-continued

| UL | CAD (nm) | FW (Deg.) | CF (Oe) | MF1 (%) | MF2 (%) |
|---|---|---|---|---|---|
| Ti-Zr | 0.3125 | 1.8 | 1590 | 4.9 | 18.4 |
| Glass (Cp.) | — | 7.9 | 1450 | — | — |

UL.: Underlayers
CAD: Distance between Closest Atoms
FW: Full Width at Half Maximum of X-Ray Rocking Curve
CF: Coercivity in Perpendicular Direction
MF1: Misfit Percentage 1
MF2: Misfit Percentage 2
Cp.: Comparison <Embodiment 3>

A single-crystal substrate (having a plane (111) in parallel with the substrate plane and a surface roughness of Ra=3 nm) of $(Mn, Zn)O \cdot Fe_2O_3$ having a mirror-polished surface and a diameter of 0.8 inches was used to prepare magnetic recording media having a sectional structure, as in Embodiment 1 shown in FIG. 4, by the DC magnetron sputtering method. A single-crystal substrate 41 is formed on its two sides with Co alloy magnetic films 42 and 42' and carbon protective films 43 and 43' in the recited order. Incidentally, the single-crystal substrate of $(Mn, Zn)O \cdot Fe_2O_3$ has a cubic spinel structure, and the Co alloy magnetic films have a hexagonal close-packed structure. The Co alloy magnetic films and the carbon protective films were formed by using argon gases under conditions of a gas pressure of 0.7 Pa, a substrate temperature of 250° C. and a filming rate of 50 nm/min. The target to be used for forming the magnetic films was composed of Co—16 at. % of Cr—6 at. % of Pt. The Co alloy magnetic films had a thickness of 100 nm, and the carbon protective films had a thickness of 10 nm. The formations of all the aforementioned films were continued in an identical vacuum chamber without interrupting the evacuation. The composition of the Co alloy magnetic films was substantially identical to that of the target, i.e., $CoCr_{15}Pt_6$.

The samples thus prepared had their crystal orientations measured by the X-ray diffractions. By the X-ray diffractions, it has been confirmed that the Co alloy had the direction [0001] oriented in the direction perpendicular to the film plane. By measuring the X-ray pole figure, moreover, crystal orientation in the film plane was also revealed to orient intensely. The full width at half maximum of the rocking curve of the 0002 diffraction peak of the Co alloy was improved better than that of the case in which the glass substrate was used.

Figure 6:
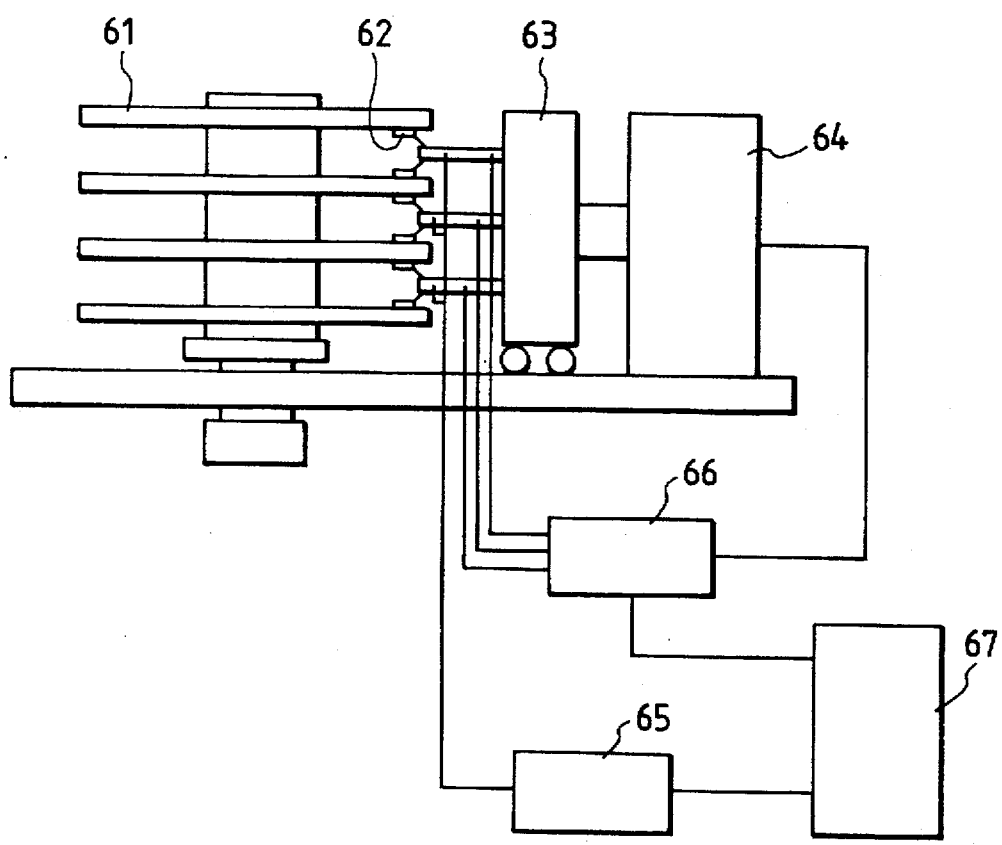
FIG. 6 is a schematic diagram showing one mode of embodiment of a magnetic recording device of the present invention.

By using such perpendicular magnetic recording media, there was prepared a magnetic recording device according to the perpendicular magnetic recording method, as schematically shown in FIG. 6. Perpendicular magnetic recording media 61 are held by a holder to be turned by a motor and are arranged with magnetic heads 62 corresponding to the individual magnetic films for writing/reading information. The magnetic heads 62 are moved relative to the magnetic recording media 61 by an actuator 63 and a voice coil motor 64. These are controlled by a recording/reproducing circuit 65, a positioning circuit 66 and an interface control circuit 67. In case the magnetic recording/reproducing heads were exemplified by single pole heads or by a composite head of the recording single pole head and the reproducing magnetoresistive head, a high density recording of high S/N ratio could be better effected than that of the media which were formed over the glass substrate. Similar effects were also achieved by using a ring head in place of the single pole head.

Moreover, similar improvement effects to the aforementioned ones were confirmed in case the substrate was exemplified by any of the ferrite single-crystal substrates made of $(Ni, Zn)O \cdot Fe_2O_3$, $(Zn, Fe)O \cdot Fe_2O_3$ and $(Mg, Mn)O \cdot Fe_2O_3$ having a cubic crystal structure. Similar effects could also be obtained in case the substrate was exemplified by a single-crystal substrate made of $BaO \cdot 6Fe_2O_3$ (having a plane (0001) in parallel with the substrate plane) having a hexagonal magnetoplumbite structure. These results are enumerated as the relative S/N ratio (dB) at a recording density of 100 kFCI in Table 3, and it is found from the S/N ratio that a preferable result is achieved by $(Mn, Zn) \cdot Fe_2O_3$.

TABLE 3

| Substrate | Relative S/N Ratio (dB) at Recording Density of 100 kFCI |
| --- | --- |
| $(Mn, Zn)O \cdot Fe_2O_3$ | 2.1 |
| $(Ni, Zn)O \cdot Fe_2O_3$ | 1.9 |
| $(Zn, Fe)O \cdot Fe_2O_3$ | 1.5 |
| $(Mg, Mn)O \cdot Fe_2O_3$ | 1.0 |
| $BaO \cdot 6Fe_2O_3$ | 1.0 |
| Glass (Cp.) | 0.0 |

Cp.: Comparison

<Embodiment 4>

A single-crystal substrate (having a plane (111) in parallel with the substrate plane) of $SrTiO_3$ having a mirror-polished surface and a diameter of 0.8 inches was used to prepare magnetic recording media having a sectional structure, as in Embodiment 2 shown in FIG. 5, by the DC magnetron sputtering method. A single-crystal substrate 51 is formed on its two sides with Ni under-layers 52 and 52', Co alloy magnetic films 53 and 53' and carbon protective films 54 and 54' in the recited order. Incidentally: the single-crystal substrate of $SrTiO_3$ has a cubic perovskite structure; the Ni under-layers have a face-centered cubic structure; and the Co alloy magnetic films have a hexagonal close-packed structure. Prior to the film formations, the surface of the substrate was sputtered with argon ions to form fine corrugations having an average depth of about 2 nm. The Ni underlayers, the Co alloy magnetic films and the carbon protective films were formed by using argon gases under conditions of a gas pressure of 0.7 Pa, a substrate temperature of 250° C. and a filming rate of 50 nm/min. The target to be used for forming the magnetic films was composed of Co—16 at. % of Cr—6 at. % of Pt. The Ni underlayers had a thickness of 10 nm; the Co alloy magnetic films had a thickness of 100 nm; and the carbon protective films had a thickness of 10 nm. The formations of all the aforementioned films were continued in an identical vacuum chamber without interrupting the evacuation. The composition of the Co alloy magnetic films was substantially identical to that of the target, i.e., $CoCr_{16}Pt_6$.

The samples thus prepared had their crystal orientations measured by the X-ray diffractions, and it has been confirmed that the Co alloy had the direction [0001] oriented in the direction perpendicular to the film plane, and that crystal orientation in the film plane was also revealed to orient intensely. By using these perpendicular magnetic recording media, there was prepared a magnetic recording device according to the perpendicular magnetic recording method, as schematically shown in FIG. 6. In case the magnetic recording/reproducing heads were exemplified by single pole heads or by a composite head of the recording single pole head and the reproducing magnetoresistive head, a high density recording of high S/N ratio (as high as 1.7 dB at the relative S/N ratio) could be better effected than that of the media which were formed over the glass substrate. In case, moreover, the recording/reproducing operations were performed while the magnetic heads 62 and the perpendicular magnetic recording media 61 being in contact, a higher S.N ratio (as high as 2.0 dB) was achieved, as compared with that of the media formed over the glass substrate. In case the aforementioned Ni underlayers were replaced by the Co or Ni-Fe alloy having the face-centered cubic structure, a high S/N ratio (as high as 1.8 to 2.2 dB) was also achieved.

According to the present invention, it is possible to provide high-performance perpendicular magnetic recording media, which are formed with films with perpendicular magnetic anisotropy having an extremely intense orientation and exhibiting a high perpendicular magnetic anisotropy by the epitaxial growth over the single crystal, thereby to effect a high-density perpendicular magnetic recording.

What is claimed is:

1. Perpendicular magnetic recording media comprising: a substrate made of a single crystal; a film with perpendicular magnetic anisotropy formed over said substrate and made of Co or an alloy having a main component of Co; and a protective film formed over said film with perpendicular magnetic anisotropy, wherein said film with perpendicular magnetic anisotropy is epitaxially grown over said substrate to have an easy axis of magnetization perpendicular to the plane of said substrate, wherein the plane of said substrate is as even as to have a surface roughness Ra of no more than 10 nm, and wherein a distance between the nearest atoms in said substrate plane (as called the "a(S)") and a distance between the nearest atoms in a plane of said film with perpendicular magnetic anisotropy in parallel with said substrate (as called the "a(F)") satisfy the following relation:

$$|a(F)-a(S)|/a(S) \geqq 0.005.$$

2. Perpendicular magnetic recording media according to claim 1, wherein said film with perpendicular magnetic anisotropy is formed of a plurality of crystal grains, wherein individual crystal grains, of the plurality of crystal grains, each has a first crystal axis which is perpendicular to said substrate plane, and has a second crystal axis perpendicular to said first crystal axis so as to be arranged in one direction of said substrate plane.

3. Perpendicular magnetic recording media comprising: a substrate made of a single crystal; an underlayer formed over said substrate; a film with perpendicular magnetic anisotropy formed over said underlayer and made of Co or an alloy having a main component of Co; and a protective film formed over said film with perpendicular magnetic anisotropy, wherein said underlayer and said film with perpendicular magnetic anisotropy are epitaxially grown over said substrate and said underlayer, respectively, such that the film with perpendicular magnetic anisotropy has an easy axis of magnetization perpendicular to the plane of said substrate, wherein the plane of said substrate is as even as to have a surface roughness Ra of no more than 10 nm, and wherein a distance between the nearest atoms in said substrate plane (as called the "a(S)") and a distance between the nearest atoms in a plane of said underlayer in parallel with said substrate (as called the "a(U)") satisfy the following relation:

$$|a(U)-a(S)|/a(S) \geqq 0.005.$$

4. Perpendicular magnetic recording media according to claim 3, wherein said underlayer is formed of a plurality of crystal grains, wherein individual crystal grains, of the plurality of crystal grains, each has a first crystal axis which is perpendicular to said substrate plane, and has a second crystal axis perpendicular to said first crystal axis so as to be arranged in one direction of said substrate plane, wherein said film with perpendicular magnetic anisotropy is formed of a plurality of crystal grains, with individual crystal grains, of the plurality of crystal grains of the film with perpendicular magnetic anisotropy, each having a third crystal axis perpendicular to said substrate plane, and having a fourth crystal axis perpendicular to said third crystal axis so as to be arranged in one direction of said substrate plane.

5. Perpendicular magnetic recording media according to claim 3, wherein a distance between the nearest atoms in a plane of said underlayer in parallel with said substrate plane (as called the "a(U)"), and a distance between the nearest atoms in a plane of said film with perpendicular magnetic anisotropy in parallel with said substrate (as called the "a(F)") satisfy the following relations:

$$|a(F)-a(U)|/a(U) \leq 0.25.$$

6. Perpendicular magnetic recording media according to claim 3, wherein a distance between the nearest atoms in a plane of said underlayer in parallel with said substrate plane (as called the "a(U)"), and a distance between the nearest atoms in a plane of said film with perpendicular magnetic anisotropy in parallel with said substrate (as called the "a(F)") satisfy the following relations:

$$|a(F)-a(U)|/a(U) \leq 0.15.$$

7. Perpendicular magnetic recording media according to any one of claims 1, 2, 3, 4, 5 and 6, wherein said substrate has a hexagonal crystal structure and a plane (0001) in parallel with said substrate plane.

8. Perpendicular magnetic recording media according to any one of claims 1, 2, 3, 4, 5 and 6, wherein said substrate is made of a material selected from the group consisting of chemical compounds of $Al_2O_3$, $Cr_2O_3$, BeO, ZnO and a material composed mainly of any of said chemical compounds having a hexagonal crystal structure and has a plane (0001) in parallel with said substrate plane.

9. Perpendicular magnetic recording media according to any one of claims 1, 2, 3, 4, 5 and 6, wherein said substrate has a cubic crystal structure and a plane (111) in parallel with said substrate plane.

10. Perpendicular magnetic recording media according to any one of claims 1, 2, 3, 4, 5 and 6, wherein said substrate is made of a material selected from the group consisting of chemical compounds and elements of MgO, LiF, $SrTiO_3$, $CaF_2$, $BaF_2$, SiC, Si, Ge and a material composed mainly of any of said chemical compounds or elements having a cubic crystal structure and has a plane (111) in parallel with said substrate.

11. Perpendicular magnetic recording media according to any one of claims 1, 2, 3, 4, 5 and 6, wherein said substrate is made of a soft magnetic material and has a hexagonal crystal structure and plane (0001) in parallel with said substrate plane.

12. Perpendicular magnetic recording media according to any one of claims 1, 2, 3, 4, 5 and 6, wherein said substrate is made of a soft magnetic material and has a cubic crystal structure and a plane (111) in parallel with said substrate plane.

13. Perpendicular magnetic recording media according to any one of claims 1, 2, 3, 4, 5 and 6, wherein said substrate is made of a ferrite, as expressed by a chemical formula of $MO \cdot nFe_2O_3$ where n designates a positive integer not zero and where M designates a metallic element, and wherein said metal M is at least one of the materials selected from the group consisting of elements Mn, Fe, Ni, Zn and Mg, and mixtures containing at least two of said elements.

14. Perpendicular magnetic recording media according to any one of claims 1, 2, 3, 4, 5 and 6, wherein said substrate is made of a ferrite, as expressed by a chemical formula of $BaO \cdot 6Fe_2O_3$.

15. Perpendicular magnetic recording media according to any one of claims 1, 2, 3, 4, 5 and 6, wherein said underlayer has a hexagonal close-packed structure and an orientation of {0001} perpendicular to the substrate plane.

16. Perpendicular magnetic recording media according to any one of claims 1, 2, 3, 4, 5 and 6, wherein said underlayer is made of at least one material having a hexagonal close-packed structure and selected from a group consisting of elements Co, Hf, Mg, Os, Re, Ru, Ti, Zn and Zr and alloys composed mainly of any of said elements, and an orientation of {0001} perpendicular to the substrate plane.

17. Perpendicular magnetic recording media according to any one of claims 1, 2, 3, 4, 5 and 6, wherein said underlayer has a face-centered cubic structure and an orientation of <111> perpendicular to the substrate plane.

18. Perpendicular magnetic recording media according to any one of claims 1, 2, 3, 4, 5 and 6, wherein said underlayer is made of at least one material having a face-centered cubic structure and selected from a group consisting of elements Ag, Al, Au, Co, Cu, Ir, Ni, Pd, Pt and Rh and alloys composed mainly of any said elements, and has an orientation of <111> perpendicular to the substrate plane.

19. Perpendicular magnetic recording media according to any one of claims 1, 2, 3, 4, 5 and 6, wherein said film with perpendicular magnetic anisotropy has a hexagonal close-packed structure.

20. Perpendicular magnetic recording media according to any one of claims 1, 2, 3, 4, 5 and 6, wherein said film with perpendicular magnetic anisotropy has a hexagonal close-packed structure and an orientation of {0001} perpendicular to the substrate plane.

21. Perpendicular magnetic recording media according to any one of claims 1, 2, 3, 4, 5 and 6, wherein said substrate has its plane formed with fine corrugations.

22. A magnetic recording device comprising: perpendicular magnetic recording media according to any one of claims 1, 2, 3, 4, 5 and 6; a holder for holding said perpendicular magnetic recording media; a magnetic head for recording/reproducing information in/from said perpendicular magnetic recording media; moving means for moving the relative positions of said magnetic head and said perpendicular magnetic recording media; and control means for controlling those components.

23. A magnetic recording device according to claim 22, wherein said information recording/reproducing magnetic head is a thin film ring head.

24. A magnetic recording device according to claim 22, wherein said information recording magnetic head is a thin film ring head, and wherein said information reproducing magnetic head is a magnetoresistive head.

25. A magnetic recording device according to claim 22, wherein said information recording/reproducing magnetic head is a single pole head.

26. A magnetic recording device according to claim 22, wherein said information recording magnetic head is a single pole head, and wherein said information reproducing magnetic head is a magnetoresistive head.

27. A magnetic recording device according to claim 22, wherein said perpendicular magnetic recording media and said information recording/reproducing magnetic head record and reproduce the information while contacting with each other.

28. A magnetic recording device according to claim 22, wherein said perpendicular magnetic recording media and said information recording/reproducing magnetic head are arranged close to each other to record and reproduce the information.

* * * * *